United States Patent [19]

Edamura et al.

[11] 3,852,319

[45] Dec. 3, 1974

[54] SUBSTITUTED THIO-AND DITHIO-CARBANILATES

[75] Inventors: Fred Y. Edamura; Thomas J. Giacobbe, both of Midland, Mich.

[73] Assignee: The Dow Chemical Company, Midland, Mich.

[22] Filed: Sept. 24, 1973

[21] Appl. No.: 400,474

Related U.S. Application Data

[62] Division of Ser. No. 194,532, Nov. 1, 1971, Pat. No. 3,790,619.

[52] U.S. Cl.............. 260/455 A, 71/98, 71/100, 71/111, 260/470, 260/471, 424/300
[51] Int. Cl................. C07c 155/02, C07c 155/08
[58] Field of Search................................. 260/455 A

[56] References Cited
UNITED STATES PATENTS
3,714,233  1/1973  Larsen et al................... 260/455 A

*Primary Examiner*—Elbert L. Roberts
*Assistant Examiner*—D. R. Phillips
*Attorney, Agent, or Firm*—Gary D. Street

[57] ABSTRACT

Compounds useful as herbicides and fungicides defined as substituted (thio- and dithio-)carbanilate compounds and derivatives thereof.

2 Claims, No Drawings

SUBSTITUTED THIO- AND DITHIO-CARBANILATES

This is a division of application Ser. No. 194,532 filed Nov. 1, 1971 now U.S. Pat. No. 3,790,619.

SUMMARY OF THE INVENTION

The compounds of the present invention may be structurally represented by the formula:

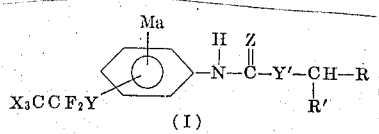

(I)

wherein:
  each X independently represents hydrogen, bromo, chloro or fluoro, with the proviso that at least one X is always bromo, chloro or fluoro;
  Y, Y' and Z each independently represent oxygen or sulfur;
  each M independently represents bromo, chloro, fluoro, iodo, nitro or lower alkyl of from one to about four carbon atoms;
  $a$ represents an integer of from 0 to 3, both inclusive;

R represents hydrogen, lower alkyl of from one to five carbon atoms optionally substituted with from 1 to 2 bromo, chloro or fluoro atoms, lower alkenyl of from two to four carbon atoms optionally substituted with from 1 to 2 bromo, chloro or fluoro atoms or lower alkynyl of from two to four carbon atoms, with the proviso that when said lower alkyl and lower alkenyl are optionally substituted with from 1 to 2 bromo, chloro or fluoro atoms, Y' is oxygen; and
  R' is hydrogen or methyl.

Said substituted (thio)carbanilate compounds are valuable agents as herbicides and fungicides. Among the preferred species herein are those wherein X is chloro, especially dichloro, Y is oxygen and R is loweralkyl.

As used in the present specification and claims the term "lower alkyl" means saturated, monovalent aliphatic radicals, including straight and branched-chain radicals of from one to about five carbon atoms, as illustrated by methyl, ethyl, propyl, isopropyl, butyl, sec.-butyl, tert.-butyl, pentyl and the like.

The term "lower alkenyl" as used in the present specification and claims means unsaturated, aliphatic radicals, including straight and branched-chain radicals of from two to about four carbon atoms, as illustrated by, but not limited to, vinyl, propenyl, butenyl and the like.

The term "lower alkynyl" as used in the present specification and claims means unsaturated, aliphatic radicals, including straight and branched-chain radicals of from two to about four carbon atoms, as illustrated by, but not limited to, ethynyl, propynyl, butynyl and the like.

The products of the present invention are usually liquids or crystalline solids at room temperature which are of varying degrees of solubility in many common organic solvents and of low solubility in water. The novel compounds are suitable for use as herbicides and fungicides.

The subject compounds (I) of the present invention are prepared by reacting an appropriately selected reactive alcohol or thiol compound of the formula:

(II)

with an appropriate iso- or isothio-cyanate compound of the formula:

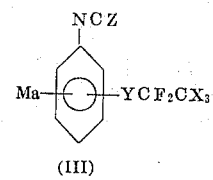

(III)

wherein R, R', M, $a$, Y, Y', Z and X are as previously defined. The reaction is ordinarily carried out in a suitable inert organic solvent such as, for example, dichloromethane, toluene, benzene, and the like. In order to decrease reaction time, a small amount of an actuating agent, e.g., triethylamine, dibutyltindiacetate and the like, can be incorporated into the reaction mixture. In the present invention, the employment of an actuating agent is preferred.

In carrying out the reaction, the iso- or isothiocyanate (III) and alcohol or thiol (II) reactants are mixed in the presence of an organic solvent as described and the actuating agent added to the resulting mixture. Depending upon the nature of the alcohol or thiol reactant, the reaction can, in certain instances, be carried out in the absence of an inert organic solvent if desired.

The amount of reactants employed is not critical and essentially equimolar proportions of the reactants are usually employed; it is desirable, however, that a molar excess of the actuating agents be employed. Generally, the reaction is conducted under ambient atmospheric pressure and an inert atmosphere, such as, for example, nitrogen, can be employed if desired.

The reaction proceeds readily, often exothermically, at ambient temperatures of from about 20° to about 40° C. Usually, the reaction mixture is allowed to stand at ambient temperature for a period of from about one-half hour to about 12 hours before the inert organic solvent, where employed, is removed by evaporation under reduced pressure. In the preparation of those compounds wherein the lower alkyl or lower alkenyl R groups are optionally substituted with from 1 to 2 bromo, chloro or fluoro atoms, the reaction mixture is usually allowed to stand at ambient temperatures for a period of from about 12 to about 40 hours prior to removal of the solvent.

The product residue thus obtained is distilled to yield the desired product which, if desired, can be further purified by employing conventional techniques such as recrystallization, fractional distillation, separative chromatography and the like.

The desirable properties of the products of the instant invention are inherent in the compounds as obtained from the reaction mixture; when highly selective properties are to be relied upon, the purified compounds will be preferred. However, for many applications, wherein low cost is a major consideration, incompletely purified products can be used if desired.

DESCRIPTION OF THE PREFERRED EMBODIMENTS

The following examples are presented to illustrate preparation of typical compounds of the invention but the scope of the invention is not to be considered limited to the specific examples given.

EXAMPLE 1

3-(2,2-Dichloro-1,1-difluoroethoxy)phenylisocyanate (4.85 grams; 0.018 mole) was mixed with isopropyl alcohol (20 milliliters) and three drops of dibutyltindiacetate added to the resulting mixture. The reaction flask containing the reaction mixture was stoppered and allowed to stand at ambient temperature for a period of about 2 hours. Following the reaction period, the reaction mixture was evaporated under reduced pressure to remove excess isopropyl alcohol. The residue thus obtained was distilled and the desired isopropyl 3-(2,2-dichloro-1,1-difluoroethoxy)carbanilate product was obtained as a clear viscous off-white liquid having a boiling point of 140°C. at 0.25 mm. of Hg.

EXAMPLE 2

3-(2,2-Dichloro-1,1-difluoroethoxy)phenylisocyanate (4 grams; 0.0015 mole) was dissolved in dichloromethane (15 milliliters) and ethanethiol (92 milligrams; 0.0015 mole) and three drops of triethylamine added thereto. The resulting reaction mixture boiled rapidly. The reaction flask containing the reaction mixture was fitted with a drying tube and maintained at ambient temperatures for a period of about one hour. The solvent carrier was then removed from the reaction mixture by evaporation under reduced pressure and the oily residue thus obtained crystallized when scratched with a glass rod. The product was further purified by molecular distillation to obtain the desired S-ethyl 3-(2,2-dichloro-1,1-difluoroethoxy)thiocarbanilate product as a white crystalline solid having a melting point of 59°–61°C.

EXAMPLE 3

3-(2,2-Dichloro-1,1-difluoroethoxy)phenylisocyanate (3.0 grams; 0.0011 mole) was mixed with chloroethanol (5.0 milliliters) and dibutyltindiacetate (3 drops) added thereto. The resulting reaction mixture was maintained at ambient temperatures for a period of about 30 hours. Following the reaction period, about 80 milliliters of benzene was added to the reaction mixture and the resulting solution washed with water and then dried over anhydrous sodium sulfate. Concentration of the reaction mixture by evaporation under reduced pressure yielded the desired 2-chloroethyl 3-(2,2-dichloro-1,1-difluoroethoxy)carbanilate product as a clear oil. Nuclear magnetic resonance and infrared spectral analyses are consistent with the proposed structure of the product.

Additional compounds within the scope of this invention can be prepared by the procedures detailed in the foregoing examples. In the following examples are presented the essential starting materials required to prepare the indicated named compound by the procedures heretofore described.

4-Chlorobutyl 3-(2,2-dichloro-1,1-difluoroethoxy)-carbanilate by the reaction of 3-(2,2-dichloro-1,1-difluoroethoxy)phenylisocyanate and 4-chlorobutanol.

2-Chloroethyl 4-(2,2-dichloro-1,1-difluoroethoxy)-carbanilate by the reaction of 4-(2,2-dichloro-1,1-difluoroethoxy)phenylisocyanate and chloroethanol.

Isopropyl 4-(2,2-dichloro-1,1-difluoroethoxy)-carbanilate by the reaction of 4-(2,2-dichloro-1,1-difluoroethoxy)phenylisocyanate and isopropyl alcohol.

Isopropyl 2-(2,2-dichloro-1,1-difluoroethoxy)-carbanilate by the reaction of 2-(2,2-dichloro-1,1-difluoroethoxy)phenylisocyanate and isopropyl alcohol.

Methyl 2-(2,2-dichloro-1,1-difluoroethoxy)-6-nitrocarbanilate by the reaction of 2-(2,2-dichloro-1,1-difluoroethoxy)-6-nitrophenylisocyanate and methanol.

0-ethyl 4-chloro-2-(2,2,2-trichloro-1,1-difluoroethylthio)thiocarbanilate by the reaction of 4-chloro-2-(2,2,2-trichloro-1,1-difluoroethylthio)-phenylisothiocyanate and ethanol.

S-n-butyl 6-bromo-2-(2-bromo-2-chloro-1,1-difluoroethoxy)thiocarbanilate by the reaction of 6-bromo-2-(2-bromo-2-chloro-1,1-difluoroethoxy)-phenylisocyanate and butanethiol.

0-1-Methylhexyl 2-(2,2-dibromo-1,1-difluoroethylthio)-4-fluorothiocarbanilate by the reaction of 2-(2,2-dibromo-1,1-difluoroethylthio)-4-fluoro-phenylisothiocyanate and heptanol-2.

2-Chloroethyl 2-(1,1,2,2-tetrafluoroethoxy)-6-iodocarbanilate by the reaction of 2-(1,1,2,2-tetrafluoroethoxy)-6-iodophenylisocyanate and 2-chloroethanol.

4-Bromobutyl 2-(2,2,2-tribromo-1,1-difluoroethylthio)-4,6-dinitrocarbanilate by the reaction of 2-(2,2,2-tribromo-1,1-difluoroethylthio)-4,6-dinitrophenylisocyanate and 4-bromo-1-butanol.

0-2-chloroethyl 2-(2-bromo-1,1,2-trifluoroethoxy)-4-tert.-butylthiocarbanilate by the reaction of 2-(2-bromo-1,1,2-trifluoroethoxy)-4-tert.-butylphenylisothiocyanate and 2-chloroethanol.

0-6-Chloro-1-methylhexyl 2-(2-bromo-2-chloro-1,1-difluoroethoxy)-6-methylthiocarbanilate by the reaction of 2-(2-bromo-2-chloro-1,1-difluoroethoxy)-6-methylphenylisothiocyanate and 7-chloro-2-heptanol.

2,3-Dibromopropyl 4-(2,2-dichloro-1,1-difluoroethoxy)-2,6-dimethylcarbanilate by the reaction of 4-(2,2-dichloro-1,1-difluoroethoxy)-2,6-dimethylphenylisocyanate and 2,3-dibromopropanol.

6-Chlorohexyl 3,4,5-trichloro-2-(2,2-dibromo-1,1-difluoroethylthio)carbanilate by the reaction of 3,4,5-trichloro-2-(2,2-dibromo-1,1-difluoroethylthio)-phenylisocyanate and 6-chloro-1-hexanol.

3,3-Difluoro-2-allyl 2,6-dichloro-4-(2,2-dichloro-1,1-difluoroethoxy)carbanilate by the reaction of 2,6-dichloro-4-(2,2-dichloro-1,1-difluoroethoxy)-phenylisocyanate and 3,3-difluoroallyl alcohol.

1-Methyl-5,5-difluoro-4-pentenyl 2-(2-chloro-1,1,2-trifluoroethoxy)-4-methylcarbanilate by the reaction of 2-(2-chloro-1,1,2-trifluoroethoxy)-4-methylphenylisocyanate and 1,1-difluoro-1-hexen-5-ol.

0-2-Allyl 4-bromo-6-chloro-2-(2,2-dibromo-1,1-difluoroethoxy)thiocarbanilate by the reaction of 4-bromo-6-chloro-2-(2,2-dibromo-1,1-difluoroethoxy)-phenylisothiocyanate and allyl alcohol.

S-2-butenyl 4-bromo-2-(1,1,2-trifluoroethylthio)-6-methylthiocarbanilate by the reaction of 4-bromo-2-(1,1,2-trifluoroethylthio)-6-methylphenylisocyanate and 2-butene-1-thiol.

1-Methyl-4-pentenyl 2-(2,2,2-trichloro-1,1-difluoroethoxy)-4-n-propyl-6-nitrocarbanilate by the reaction of 2-(2,2,2-trichloro-1,1-difluoroethoxy)-4-n-propyl-6-nitrophenylisocyanate and 1-hexen-5-ol.

0-3-chloro-2-allyl 6-chloro-2-(2-chloro-1,1-difluoroethylthio)-4nitrothiocarbanilate by the reaction of 6-chloro-2-(2-chloro-1,1-difluoroethylthio)-4-nitrophenylisothiocyanate and 3-chloroallyl alcohol.

0-5-Chloro-3-pentenyl 2-(2-bromo-1,1,2-trifluoroethoxy)-6-methylthiocarbanilate by the reaction of 2-(2-bromo-1,1,2-trifluoroethoxy)-6-methyl-phenylisothiocyanate and 5-chloro-3-pentene-1-ol.

1-Methyl-5-fluoro-4-pentenyl 2-(2-chloro-1,1,2-trifluoroethylthio)-4-ethyl-6-methylcarbanilate by the reaction of 2-(2-chloro-1,1,2-trifluoroethylthio)-4-ethyl-6-methylisocyanate and 1-fluoro-1hexen-5-ol.

S-2-Propynyl 2-(2-bromo-1,1-difluoroethoxy)-3,6-dimethyl-4-tert.-butyldithiocarbanilate by the reaction of 2-(2-bromo-1,1-difluoroethoxy)-3,6-dimethyl-4-tert.-butylisothiocyanate and propyne-1-thiol-3.

1-Methyl-4-pentynyl 2-(pentafluoroethylthio)-4,6-di-tert.-butylcarbanilate by the reaction of 2(pentafluoroethylthio)-4,6-di-tert.-butylphenylisocyanate and 1-hexyne-5-ol.

0-2-Chloroethyl 4-bromo-3,6-dichloro-2-(2,2-dichloro-1,1-difluoroethoxy)thiocarbanilate by the reaction of 4-bromo-3,6dichloro-2-(2,2-dichloro-1,1-difluoroethoxy)phenylisothiocyanate and chloroethanol.

0-3-Fluoro-2-allyl 6-chloro-2-(2,2,2-tribromo-1,1-difluoroethylthio)-4-ethylthiocarbanilate by the reaction of 6-chloro-2-(2,2,2tribromo-1,1-difluoroethylthio)-4-ethylphenylisothiocyanate and fluoroallyl alcohol.

S-3-pentenyl 2,6-dichloro-4-(2-chloro-1,1-difluoroethoxy)dithiocarbanilate by the reaction of 2,-6-dichloro-4-(2-chloro-1,1-difluoroethoxy)phenylisothiocyanate and 2-penten-5-thiol.

1-Methyl-4-pentynyl 6-chloro-2-(2-bromo-1,1,2-trifluoroethoxy)-4-tert.-butylcarbanilate by the reaction of 6-chloro-2-(2-bromo-1,1,2-trifluoroethoxy)-4-tert.-butylphenylisocyanate and 1-hexyne-5-ol.

0-1-Methyl-4-pentenyl 2-(2,2-dibromo-1,1-difluoroethoxy)-4,6-diethylthiocarbanilate by the reaction of 2-(2,2-dibromo-1,1-difluoroethoxy)-4,6-diethylphenylisothiocyanate and 1-hexen-5-ol.

S-hexyl 4-chloro-2-(2-chloro-1,1-difluoroethylthio)-3-ethyl-6-nitrothiocarbanilate by the reaction of 4-chloro-2-(2-chloro-1,1-difluoroethylthio)-3-ethyl-6-nitrophenylisocyanate and hexanethiol.

0-2-Propynyl 2-(2,2,2-tribromo-1,1-difluoroethoxy)-3,4,6-trinitrothiocarbanilate by the reaction of 2-(2,2,2-tribromo-1,1-difluoroethoxy)-3,4,6-trinitrophenylisothiocyanate and propargyl alcohol.

0-Ethyl 4-chloro-3-(2,2,2-trichloro-1,1-difluoroethylthio)thiocarbanilate by the reaction of 4-chloro-3-(2,2,2-trichloro-1,1-difluoroethylthio)phenylisothiocyanate and ethanol.

S-n-butyl 6-bromo-3-(2-chloro-2-bromo-1,1-difluoroethoxy)thiocarbanilate by the reaction of 6-bromo-3-(2-chloro-2-bromo-1,1-difluoroethoxy)phenylisocyanate and butanethiol.

0-6-Fluorohexyl 3-(2-bromo-2-chloro-1,1-difluoroethoxy)-6-tert.-butylthiocarbanilate by the reaction of 3-(2-bromo-2-chloro-1,1-difluoroethoxy)-6-tert.-butylphenylisothiocyanate and 6-fluorohexanol.

Hexyl 2-chloro-2-(2-bromo-1,1-difluoroethoxy)-dithiocarbanilate by the reaction of 2-chloro3-(2-bromo-1,1-difluoroethoxy)phenylisothiocyanate and hexanethiol.

1-Methyl-4-pentynyl 6-chloro-3-(2-bromo-1,1,2-trifluoroethoxy)-4-tert.-butylcarbanilate by the reaction of 6-chloro-3-(2-bromo-1,1,2-trifluoroethoxy)-phenylisocyanate and 1-hexyne-5ol.

Methyl 2,3,6-trichloro-4-(2,2-dichloro-1,1-difluoroethoxy)dithiocarbanilate by the reaction of 2,-3,6-trichloro-4-(2,2-dichloro-1,1-difluoroethoxy)-phenylisothiocyanate and methanethiol.

0-Tert.-butyl 2-bromo-4-(2,2,2-tribromo-1,1-difluoroethylthio)-6-methylthiocarbanilate by the reaction of 2-bromo-4-(2,2,2-tribromo-1,1-difluoroethylthio)-6-methylphenylisothiocyanate and tert.-butanol.

S-n-hexyl 4-(2-bromo-2-chloro-1,1-difluoroethoxy)-2-fluorothiocarbanilate by the reaction of 4-(2-bromo-2-chloro-1,1-difluoroethoxy)-2-fluorophenylisocyanate and n-hexanethiol.

0-2-Allyl 4-(2-bromo-1,1-difluoroethylthio)-2,6diiodothiocarbanilate by the reaction of 4-(2-bromo-1,1-difluoroethylthio)-2,6lthio)-2,6diiodo-phenylisothiocyanate and allyl alcohol.

S-1-methyl-4-pentenyl 4-(pentafluoroethoxy)-2-nitrothiocarbanilate by the reaction of 4-(pentafluoroethoxy)-2-nitrophenylisocyanate and 1-hexen-5-thiol.

0-2-Propynyl 4-(2-bromo-1,1,2-trifluoroethylthio-2-methylthiocarbanilate by the reaction of 4-(2-bromo-1,1,2-trifluoroethylthio)-2-methylphenylisothiocyanate and propargyl alcohol.

1-Methyl-4-pentynyl 4-(2,2-dibromo-1,1-difluoroethoxy)-2-tert.-butylcarbanilate by the reaction of 4-(2,2-dibromo-1,1difluoroethoxy)-2-tert.-butylphenylisocyanate and 1-hexyne-5-ol.

0-6-Iodo-n-hexyl 4-(2,2dichloro-1,1-difluoroethylthio)-2-fluoro-6-methylthiocarbanilate by the reaction of 4-(2,2-dichloro-1,1-difluoroethylthio)-2-fluoro-6-methylphenylisothiocyanate and 6-iodo-n-hexonal.

0-3,3-difluoro-2-allyl 4-(1,1,2,2-tetrafluoroethoxy)-2,6-diethylthiocarbanilate by the reaction of 4-(1,1,2,2-tetrafluoroethoxy)-2,6-diethylphenylisothiocyanate and 3,3-difluroallyl alcohol.

1-Methyl-5-fluoro-4-pentenyl 4-(2,2,2trichloro-1,1-difluoroethylthio)-2,6-dinitrocarbanilate by the reaction of 4-(2,2,2-trichloro-1,1-difluoroethylthio)-2,6-dinitrophenylisocyanate and 1-fluoro-1-hexen-5-ol.

0-2-Propynyl 4-(2,2,2-tribromo-1,1-difluoroethoxy)-2-methyl-6-nitrothiocarbanilate by the reaction of 4-(2,2,2-tribromo-1,1-difluoroethoxy)-2-methyl-6-nitrophenylisothiocyanate and propargyl alcohol.

1-Methyl-5-pentynyl 2,3,6-trichloro-4-(2,2-dichloro-1,1-difluoroethylthio)-6-nitrocarbanilate by the reaction of 2,3,6-trichloro-4-(2,2-dichloro-1,1-difluoroethylthio)phenylisocyanate and 1-hexyne-5-ol.

2-Bromo-3-chloro-2-butenyl 6-chloro-3-(2,2-dichloro-1,1-difluoroethoxy)carbanilate by the reaction of 6-chloro-3-(2,2-dichloro-1,1-difluoroethoxy)- phenylisocyanate and 2-bromo-3-chloro-2-butene-1-ol.

2-Chloro-3-bromopropyl 4-(2,2-dibromo-1,1-difluoroethylthio)-2,6-dimethyl carbanilate by the reaction of 4-(2,2-dibromo-1,1-difluoroethylthio)-2,6-dimethylphenylisocyanate and 2-chloro-3-bromopropanol.

The products of the present invention are suitable for uses as herbicides and fungicides. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

It is to be understood, however, that all of the compounds claimed and compositions containing them may not be equally effective at similar concentrations or against the same plants or fungal organisms. The exact concentration of the toxic substituent to be employed in the treating compositions is not critical and may vary considerably provided the plant or fungal organisms and/or their respective habitats are contacted with an effective amount of the toxicant. The concentration of the toxxicants in liquid compositions generally is from about 1.0 to about 50 percent by weight, although concentrations of up to about 95 weight percent are often employed. In dusts or dry formulatijons, the concentration of the toxicant can be from about 1.0 to about 10 weight percent; however, concentrations up to about 95 weight percent are often conveniently employed. In compositions to be employed as concentrates, the toxicant can be present in a concentration of from about 5 to about 98 weight percent.

The compounds of this invention also can be applied admixed with other chemicals which are used in agronomic and horticultural management and are compatible with the compounds of this invention. Such chemicals can be, but are not restricted to, the classes of chemicals commonly known as plant nutrients, fertilizers, insecticides, fungicides, herbicides and nematocides.

Each of the compounds of the present invention, the utility of which is not specifically recited hereinafter, has the ability to inhibit or otherwise control one or more of the above or other fungal or weed pests when applied at dosage levels of from about 4.0 to about 10,000 or more parts per million by weight.

In representative operations, each of the isopropyl 3-(2,2-dichloro-1,1-difluoroethoxy)carbanilate; S-ethyl (2-(2,2-dichloro-1,1-difluoroethoxy))thiocarbanilate; 2-chloroethyl 3-(2,2-dichloro-1,1-difluoroethoxy)carbanilate, and 4-chlorobutyl 3-(2,2-dichloro-1,1-difluoroethoxy)carbanilate compounds inhibits or gives substantially complete control of Staphylococcus aureus, Trichophyton mentagrophytes, Bacillus substilis and Mycobacterium phlei when such organisms are contacted with compositions containing one of the abovenamed compounds at a concentration of 500 parts per million by weight.

In other representative operations, each of the isopropyl 2-(2,2-dichloro-1,1-difluoroethoxy)carbanilate; 2-chloroethyl 4-(2,2-dichloro-1,1-difluoroethoxy)carbanilate and isopropyl 4-(2,2-dichloro-1,1-difluoroethoxy)carbanilate compounds inhibits or gives substantially commplete control of Trichophyton mentagrophytes and Mycobacterium phlei when such organisms are contacted with compositions containing one of the above-named compounds at a concentration of 500 parts per million by weight.

In additional representative operations, the isopropyl 3-(2,2-dichloro-1,1-difluoroethoxy)carbanilate compound gives substantially complete post-emergent control of pigweed, wild mustard-charlock, crabgrass, pinto bean, bindweed, wild oats and yellow foxtail when such plant species are sprayed to run off with a composition containing the above-named compound at a concentration of 4.0 parts per million by weight.

In other representative operations, each of the S-ethyl (3-(2,2-dichloro-1,1-difluoroethoxy))thiocarbanilate; 2-chloroethyl 3-(2,2-dichloro-1,1-difluoroethoxy)carbanilate; and 4-chlorobutyl 3-(2,2-dichloro-1,1-difluoroethoxy)-carbanilate compounds gives substantial control of pigweed and wild mustard-charlock when such plant species are sprayed to run-off with compositions containing one of the above-named compounds at a concentration of 4.0 parts per million by weight.

PREPARATION OF STARTING MATERIALS

The substituted alcohol or thiol reactants of Formula II are known compounds and can be obtained from commercial sources or prepared from known or analogous procedures described in the literature.

The substituted iso- and isothiocyanate compounds (III) employed as starting materials in the present invention are prepared by reacting an appropriately selected reactive aniline compound of the formula:

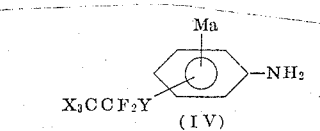

or the hydrochloride salt thereof, wherein X, Y, Z, M and $a$ are as previously described, with phosgene or thiophosgene. The reaction is carried out in a suitable organic solvent such as benzene, toulene, xylene and the like. The aniline reactant is usually mixed with a small amount of organic solvent and the resulting mixture is added dropwise, with agitation, over a period of from 1 to about 3 hours to a previously prepared cold benzene solution saturated with phosgene or thiophosgene gas. Where the hydrochloride salt of the aniline reactant is employed, a small amount of triethylamine is also added with the organic solvent and the reaction flask stoppered, agitated at ambient temperatures for about 3 to about 10 minutes, and then filtered, prior to addition to the cold benzenephosgene solution, to remove triethylamine hydrochloride precipitate. Following the addition of the anilinecontaining solution to the phosgene-saturated benzene solution, the reaction mixture is maintained at ambient temperatures for a period from about 6 to about 24 hours. The reaction mixture is then warmed to about 40 to about 60°C. for about 1 to about 4 hours while sparging with nitrogen gas and then cooled, filtered, and concentrated by evaporation under reduced pressure to yield the desired product (III). The product thus obtained can further be purified according to previously described procedures.

REPRESENTATIVE EXAMPLE 3-(2,2-Dichloro-1,1-difluoroethoxy)aniline hydrochloride (5.0grams; 0.018mole) was triturated with dry benzene (30 milliliters) and dry triethylamine (6.5 milliliters; 0.054 mole) was added thereto. The flask containing the mixture was stoppered and agitated at ambient temperatures for about 5 minutes. The resulting triethylamine hydrochloride precipitate was removed by vacuum filtration and the filtrate added, dropwise with agitation, over a period of about 2 hours to a previously prepared solution of cold benzene saturated with phosgene gas. Following the addition of the filtrate, the reaction mixture was maintained at ambient temperatures for a period of about 14 hours and then heated to about 50°C. for about 2 hours under a nitrogen gas purge. The reaction mixture was cooled to room temperature and filtered to remove any undissolved material. Removal of the benzene solvent under reduced pressure gave a light yellow oil representing the desired 3-(2,2-dichloro-1,1-difluoroethoxy)phenylisocyanate product having a boiling point of 88°C. at 0.4 mm. Hg.

The aniline reactants employed directly above can be prepared by reacting known substituted aminothiophenol or nitrophenol compounds with known compounds of the formula $X_2C=CF_2$, wherein X is hydrogen, bromo, chloro or fluoro and at least one X is bromo or chloro, according to known or analogous procedures described in the literature. See, for example, J. Lichtenberger and A. M. Geyer, *Bull. Soc. Chim. France*, 4, pp. 581–592 (1957) and William A. Sheppard, *Journal of Organic Chemistry*, Vol. 29, No. 1, pp. 1–15 (1964). Isocyanate and aniline reactants of formulas III and IV above are also described by O. Scherer and G. Horlein in Republic of South Africa Pat. No. 691,009, Jan., 1969.

The $CX_2HCF_2Y$- moiety of the resulting substituted amino or nitro compounds can readily be converted to the $CX_3CF_2Y$— moiety of the present invention, wherein X and Y are as defined hereinbefore, by further photochemical halogenation reactions known to those skilled in the art with appropriate halogenating agents such as, for example, $Cl_2$, ClBr and the like. Compounds wherein X is further fluorinated are obtained by selectively reacting compounds wherein X is bromo or chloro with molten antimony fluorochloro compounds according to known procedures at temperatures of from about 80 to about 120°C. for a period of from about one-half to about 2 hours.

The nitrophenol starting materials bearing the $CX_3CF_2Y$— moiety are readily reduced to the corresponding desired anilines with various reducing agents, such as, for example, zinc-hydrochloric acid, hydrogen-Raney nickel, and the like.

We claim:
1. Substituted thio- and dithio- carbanilate compounds corresponding to the formula:

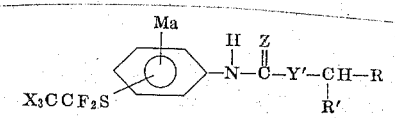

wherein:
each X independently represents hydrogen, bromo, chloro, or fluoro, with the proviso that at least one X is always bromo, chloro or fluoro;
Y, Y' and Z each independently represent oxygen or sulfur;
each M independently represents bromo, chloro, fluoro, iodo, nitro or lower alkyl of from one to about four carbon atoms;
a represents an integer of from 0 to 3, both inclusive;

R represents hydrogen, lower alkyl of from one to five carbon atoms, lower alkenyl of from two to four carbon atoms, or lower alkynyl of from two to four carbon atoms; and
R' is hydrogen or methyl.
2. A compound according to claim 1 which is S-ethyl 3-(2,2-dichloro-1,1-difluoroethoxy)thiocarbanilate.

* * * * *

PO-1050
(5/69)

UNITED STATES PATENT OFFICE
CERTIFICATE OF CORRECTION

Patent No. 3,852,319   Dated   December 3, 1974

Inventor(s) Fred Y. Edamura and Thomas J. Giacobbe

It is certified that error appears in the above-identified patent and that said Letters Patent are hereby corrected as shown below:

Column 5, line 37, insert a bond "-" between 2 and tribromo;

Column 6, line 12, insert a bond "-" between 5 and ol;

Column 6, line 28, insert a bond "-" between 2,6 and diiodothiocarbanilate;

Column 6, line 29, delete the "1" between 2,6 and thio and insert in place thereof a bond "-";

Column 6, line 43, insert a bond "-" between 2,2 and dichloro;

Column 7, line 32, correct spelling of "toxicants";

Column 7, line 35, correct spelling of "formulations";

Column 7, line 53, insert the word "said" after the word "above";

Column 7, line 66, insert a dash "-" between the words "above" and "named";

Column 8, line 6, correct spelling of "complete";

Column 8, line 50, correct spelling of "toluene";

Column 8, line 64, insert a dash "-" between the words "aniline" and "containing";

Column 10, lines 20-25, the formula should appear as follows:

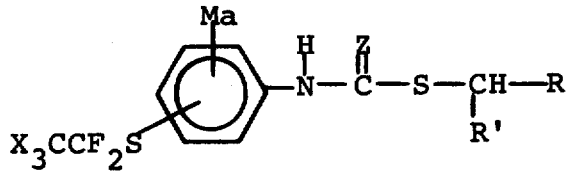

Signed and sealed this 8th day of April 1975.

(SEAL)
Attest:

RUTH C. MASON
Attesting Officer

C. MARSHALL DANN
Commissioner of Patents
and Trademarks